(12) United States Patent
Kaplan et al.

(10) Patent No.: US 7,538,690 B1
(45) Date of Patent: May 26, 2009

(54) METHOD OF COLLECTING PARKING AVAILABILITY INFORMATION FOR A GEOGRAPHIC DATABASE FOR USE WITH A NAVIGATION SYSTEM

(75) Inventors: Lawrence M. Kaplan, Northbrook, IL (US); Howard R. Hayes, Jr., Glencoe, IL (US); Steven Devries, Schererville, IN (US); Matthew G. Lindsay, San Jose, CA (US)

(73) Assignee: Navteq North America, LLC, Chicago, IL (US)

( * ) Notice: Subject to any disclaimer, the term of this patent is extended or adjusted under 35 U.S.C. 154(b) by 259 days.

(21) Appl. No.: 11/342,351

(22) Filed: Jan. 27, 2006

(51) Int. Cl.
*B60Q 1/48* (2006.01)
*G06K 9/00* (2006.01)

(52) U.S. Cl. .................. 340/932.2; 348/104; 705/13; 340/937

(58) Field of Classification Search ................ 348/148, 348/143; 340/143, 937, 932.2, 148, 933; 705/13, 18; 382/104
See application file for complete search history.

(56) References Cited

U.S. PATENT DOCUMENTS

| | | | |
|---|---|---|---|
| 5,091,727 A | 2/1992 | Mahmood | 340/932.2 |
| 5,103,400 A | 4/1992 | Yamada et al. | 364/444 |
| 5,432,508 A | 7/1995 | Jackson | 340/932.2 |
| 5,504,314 A | 4/1996 | Farmont | 235/384 |
| 5,748,107 A | 5/1998 | Kersken et al. | 340/905 |
| 5,877,704 A | 3/1999 | Yoshida | 340/932.2 |
| 5,910,782 A | 6/1999 | Schmitt et al. | 340/995 |
| 6,144,318 A | 11/2000 | Hayashi et al. | 340/995 |
| 6,147,624 A | 11/2000 | Clapper | 340/932.2 |
| 6,209,026 B1 | 3/2001 | Ran et al. | 709/218 |
| 6,340,935 B1 | 1/2002 | Hall | 340/932.2 |
| 6,426,708 B1 | 7/2002 | Trajkovic et al. | 340/932.2 |
| 6,501,391 B1 * | 12/2002 | Racunas, Jr. | 340/932.2 |
| 6,927,700 B1 | 8/2005 | Quinn | 340/932.2 |
| 7,049,979 B2 * | 5/2006 | Dunning | 340/932.2 |
| 7,081,832 B2 * | 7/2006 | Nelson et al. | 340/932.2 |
| 7,123,166 B1 * | 10/2006 | Haynes et al. | 340/932.2 |
| 2002/0099574 A1 | 7/2002 | Cahill et al. | |
| 2002/0109611 A1 * | 8/2002 | Howard | 30/932.2 |
| 2002/0147543 A1 | 10/2002 | Gieseke | |
| 2003/0112154 A1 | 6/2003 | Yoakum et al. | |
| 2004/0032342 A1 | 2/2004 | Dunning | |
| 2005/0002544 A1 * | 1/2005 | Winter et al. | 382/104 |
| 2005/0190076 A1 * | 9/2005 | Howard et al. | 340/932.2 |
| 2006/0250278 A1 * | 11/2006 | Tillotson et al. | 340/932.2 |
| 2007/0008181 A1 * | 1/2007 | Rollert et al. | 340/932.2 |

FOREIGN PATENT DOCUMENTS

JP 2005-062139 3/2005
JP 2005-157518 6/2005

* cited by examiner

*Primary Examiner*—Benjamin C Lee
*Assistant Examiner*—Sigmund Tang
(74) *Attorney, Agent, or Firm*—Adil M. Mosabji; Frank J. Kozak; Jon D. Shutter

(57) ABSTRACT

A method of obtaining data for a geographic database for use with a navigation system includes collecting data indicating parking availability at a parking facility at a plurality of times and analyzing the data indicating parking availability. Based on the analyzing, the method derives historic parking data for the parking facility. The historic parking data indicates past parking availability at the parking facility at predetermined times. The historic parking data is stored in the geographic database. The historic parking data may indicate past parking availability for predetermined time intervals, days of the week, weather conditions and events.

20 Claims, 12 Drawing Sheets

FIG. 5

GEOGRAPHIC DATABASE 200

PARKING DATA RECORD 250

ID 250(1)

TYPE 250(2)

NAME 250(3)

LOCATION 250(4)

TELEPHONE 250(5)

HOURS 250(6)

COST 250(7)

NUMBER OF SPACES 250(8)

AMENITIES 250(9)

HISTORIC PARKING DATA 250(10)

OTHER 250(11)

METHOD OF COLLECTING PARKING AVAILABILITY INFORMATION FOR A GEOGRAPHIC DATABASE FOR USE WITH A NAVIGATION SYSTEM

REFERENCE TO RELATED APPLICATIONS

The present application is related to the co-pending application entitled "METHOD OF OPERATING A NAVIGATION SYSTEM TO PROVIDE PARKING AVAILABILITY INFORMATION" filed on the same date herewith, application Ser. No. 11/342,334, the entire disclosure of which is incorporated by reference herein.

BACKGROUND OF THE INVENTION

The present invention relates to a method and system for collecting information for a geographic database, and more particularly to a method and system for collecting historic parking availability information for a geographic database for use with a navigation system.

Vehicle navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a GPS system), the navigation system can examine various potential routes between the origin and destination locations to determine the optimum route. The navigation system may then provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as the positions of the roads, speed limits along portions of roads, address ranges along the road portions, turn restrictions at intersections of roads, direction restrictions, such as one-way streets, and so on. Additionally, the geographic data may include points of interest, such as restaurants, hotels, airports, gas stations, stadiums, police stations, and so on.

Although navigation systems provide many important features, there continues to be room for new features and improvements. One area in which there is room for improvement relates to providing information regarding parking availability. Providing parking availability information provides challenges. One way of providing parking availability information is to provide real-time parking availability information which indicates the current parking availability. However, real-time parking availability information has some limitations. For example, to provide real-time parking availability information requires frequent communications between the parking facility and a parking service provider. If the communications are lost or interrupted, the parking availability information is not available. Additionally, costly infrastructure must be built and maintained to gather and provide real-time parking availability information.

Accordingly, it would be beneficial to have a way to collect and model parking availability information.

SUMMARY OF THE INVENTION

To address these and other objectives, the present invention includes a method of obtaining data for a geographic database for use with a navigation system. The method comprises collecting data indicating parking availability at a parking facility at a plurality of times and analyzing the data indicating parking availability. Based on the analyzing, the method derives historic parking data for the parking facility. The historic parking data indicates past parking availability at the parking facility at predetermined times. The historic parking data is stored in the geographic database. The historic parking data may indicate past parking availability for predetermined time intervals, days of the week, weather conditions and events.

According to a further aspect, the present invention includes a method of obtaining data for a geographic database that represents roads in a geographic region. The method comprises collecting data indicating parking availability at a parking facility at a plurality of times during a predetermined time period and analyzing said the indicating parking availability to identify a pattern of past parking availability at the parking facility. The method further includes developing historic parking data that models the pattern of past parking availability. The historic parking data is associated with data representing the parking facility in the geographic database. In one embodiment, the historic parking data is stored in the geographic database. In another embodiment, the historic parking data is stored in a database separate from the geographic database.

BRIEF DESCRIPTION OF THE DRAWINGS

An exemplary embodiment of the present invention is described herein with reference to the following drawings.

FIG. 5 is a block diagram of parking facility data records contained in the geographic database depicted in FIG. 2, according to an exemplary embodiment.

DETAILED DESCRIPTION OF THE PRESENTLY PREFERRED EMBODIMENTS

I. Geographic Map Database

Figure 1:
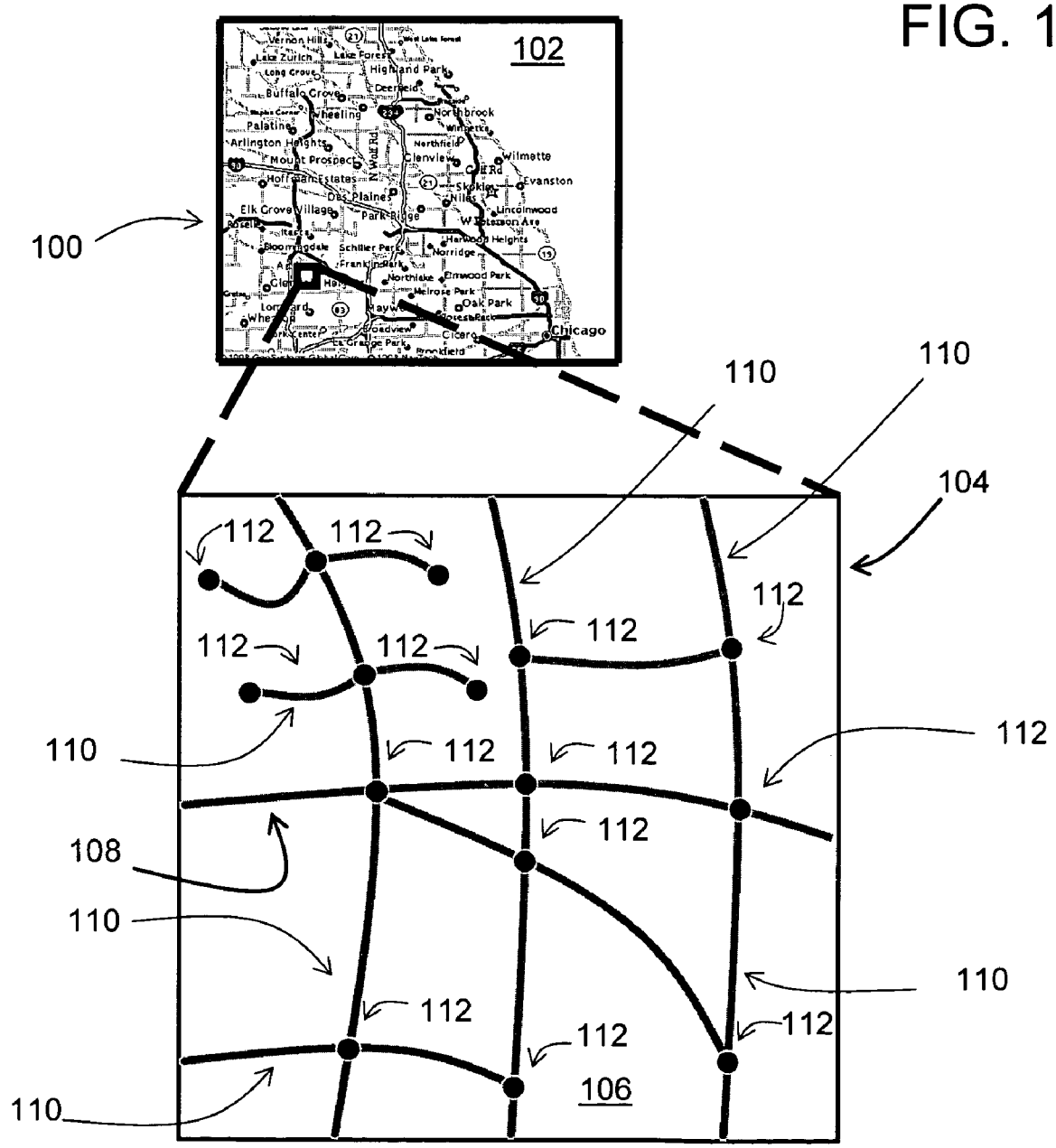
FIG. 1 illustrates a map of a geographic region.

FIG. 1 illustrates a map 100 of a geographic region 102. The geographic region 102 may correspond to a metropolitan or rural area, a state, a country, or combinations thereof, or any other area. Located in the geographic region 102 are physical geographic features, such as roads, points of interest (including businesses, municipal facilities, etc.), lakes, rivers, railroads, municipalities, etc.

FIG. 1 also includes an enlarged map 104 of a portion 106 of the geographic region 102. The enlarged map 104 illustrates part of a road network 108 in the geographic region 102. The road network 108 includes, among other things, roads and intersections located in the geographic region 102. As shown in the portion 106, each road in the geographic region 102 is composed of one or more road segments 110. A road segment 110 represents a portion of the road. Each road segment 110 is shown to have associated with it two nodes 112; one node represents the point at one end of the road segment and the other node represents the point at the other end of the road segment. The node 112 at either end of a road segment 110 may correspond to a location at which the road meets another road, i.e., an intersection, or where the road dead-ends.

Figure 2:
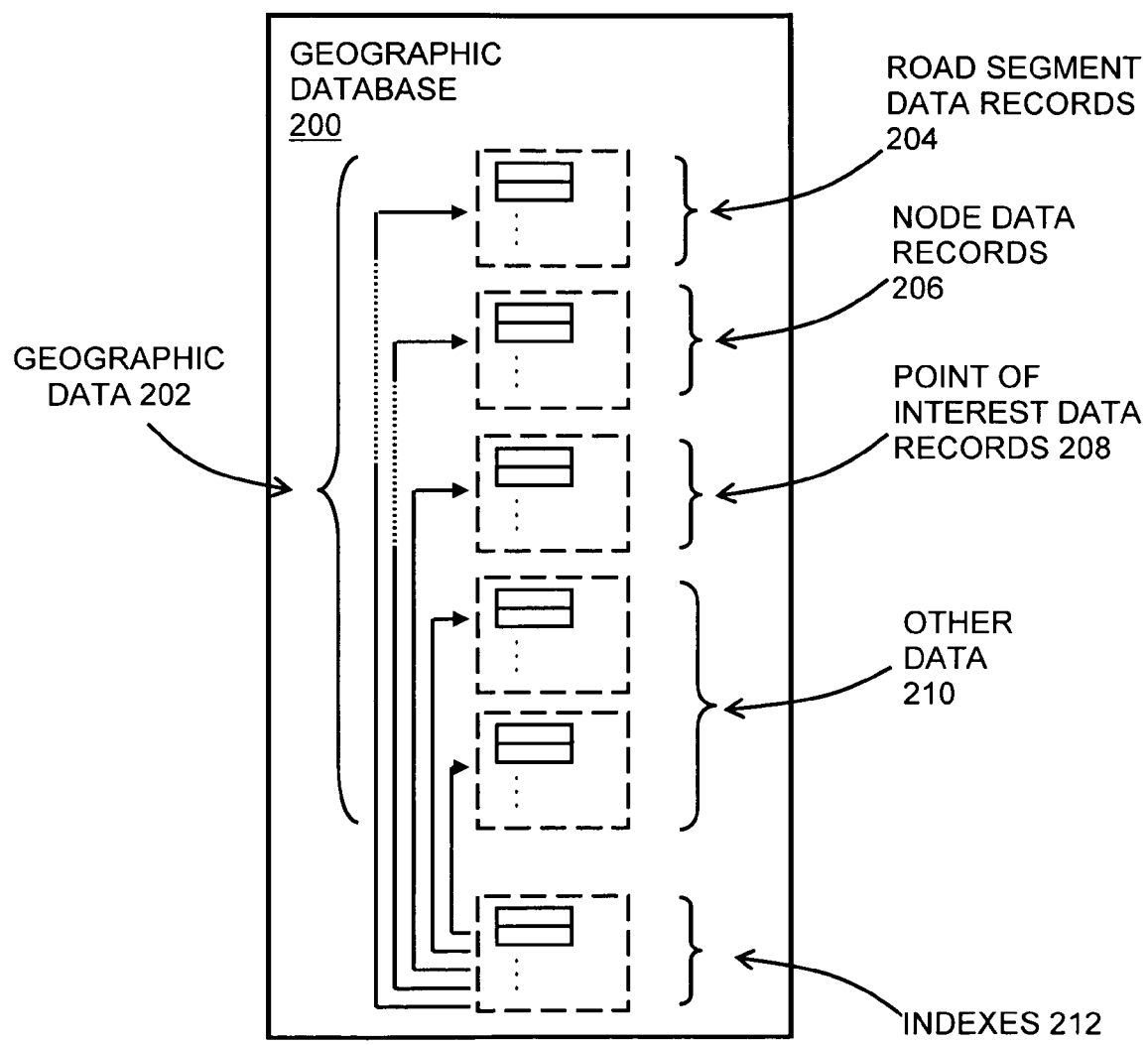
FIG. 2 is a block diagram of a geographic database, according to an exemplary embodiment.

Referring to FIG. 2, the geographic database 200 contains data 202 that represents some of the physical geographic features in the geographic region 102 depicted in FIG. 1. The data 202 contained in the geographic database 200 includes data that represent the road network 108. In the embodiment of FIG. 2, the geographic database 200 that represents the geographic region 102 contains at least one road segment data record 204 (also referred to as "entity" or "entry") for each road segment 110 in the geographic region 102. The geographic database 200 that represents the geographic region 102 also includes a node data record 206 (or "entity" or "entry") for each node 112 in the geographic region 102. The terms "nodes" and "segments" represent only one terminology for describing these physical geographic features, and other terminology for describing these features is intended to be encompassed within the scope of these concepts.

The geographic database 200 includes point of interest data 208. The point of interest data represent the various points of interest located in the geographic region 102. For example, the point of interest data 208 may include data representing businesses, buildings, facilities and parking facilities located in the geographic region 102. The geographic database 200 may also include other kinds of data 210. The other kinds of data 210 may represent other kinds of geographic features or anything else. The geographic database 200 also includes indexes 212. The indexes 212 may include various types of indexes that relate the different types of data to each other or that relate to other aspects of the data contained in the geographic database 200. For example, the indexes 212 may relate the nodes in the node data records 206 with the end points of a road segment in the road segment data records 204. As another example, the indexes 212 may relate point of interest data in the point of interest data records 208 with a road segment in the segment data records 204.

Figure 3:
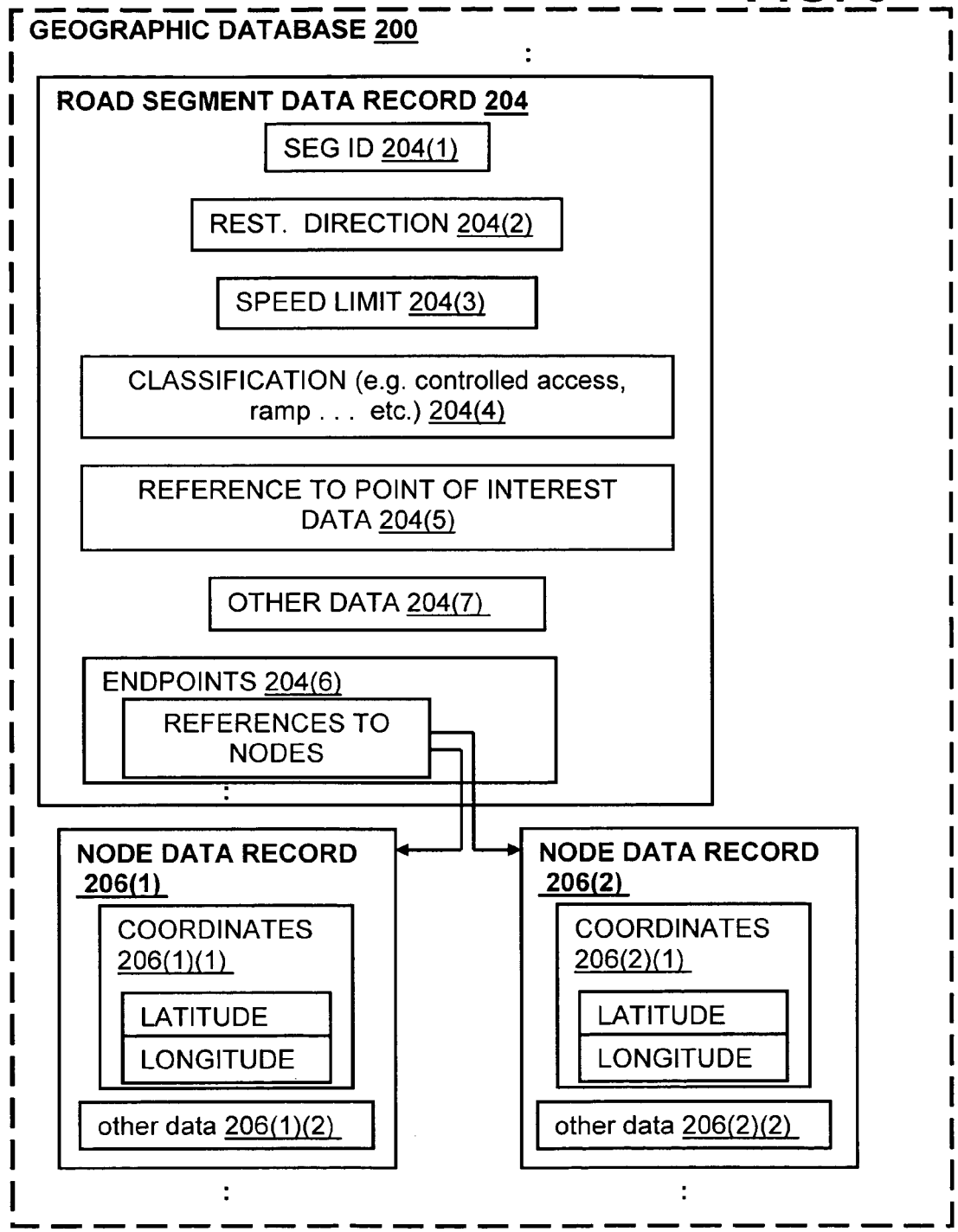
FIG. 3 is a block diagram of components of data records contained in the geographic database depicted in FIG. 2, according to an exemplary embodiment.

FIG. 3 shows some of the components of a road segment data record 204 contained in the geographic database 200. The road segment data record 204 includes a segment ID 204(1) by which the data record can be identified in the geographic database 200. Each road segment data record 204 has associated with it information (such as "attributes", "fields", etc.) that describes features of the represented road segment. The road segment data record 204 may include data 204(2) that indicate the restrictions, if any, on the direction of vehicular travel permitted on the represented road segment. The road segment data record 204 includes data 204(3) that indicate a speed limit or speed category (i.e., a range indicating maximum permitted vehicular speed of travel) on the represented road segment. The road segment data record 204 may also include data 204(4) indicating whether the represented road segment is part of a controlled access road (such as an expressway), a ramp to a controlled access road, a bridge, a tunnel, a toll road, a ferry, and so on. The road segment data record 204 may also include data 204(5) indicating the points of interest located along the road segment. In one embodiment, the data 204(5) includes references to point of interest data records 208.

The road segment data record 204 also includes data 204(6) providing the geographic coordinates (e.g., the latitude and longitude) of the end points of the represented road segment. In one embodiment, the data 204(6) are references to the node data records 206 that represent the nodes corresponding to the end points of the represented road segment.

The road segment data record 204 may also include or be associated with other data 204(7) that refer to various other attributes of the represented road segment. The various attributes associated with a road segment may be included in a single road segment record, or may be included in more than one type of record which cross-reference each other. For example, the road segment data record 204 may include data identifying what turn restrictions exist at each of the nodes which correspond to intersections at the ends of the road portion represented by the road segment, the name or names by which the represented road segment is known, the street address ranges along the represented road segment, and so on.

FIG. 3 also shows some of the components of a node data record 206 contained in the geographic database 200. Each of the node data records 206 may have associated information (such as "attributes", "fields", etc.) that allows identification of the road segment(s) that connect to it and/or it's geographic position (e.g., its latitude and longitude coordinates). For the embodiment shown in FIG. 3, the node data records 206(1) and 206(2) include the latitude and longitude coordinates 206(1)(1) and 206(2)(1) for their nodes. The node data records 206(1) and 206(2) may also include other data 206(1)(2) and 206(2)(2) that refer to various other attributes of the nodes.

Figure 4:
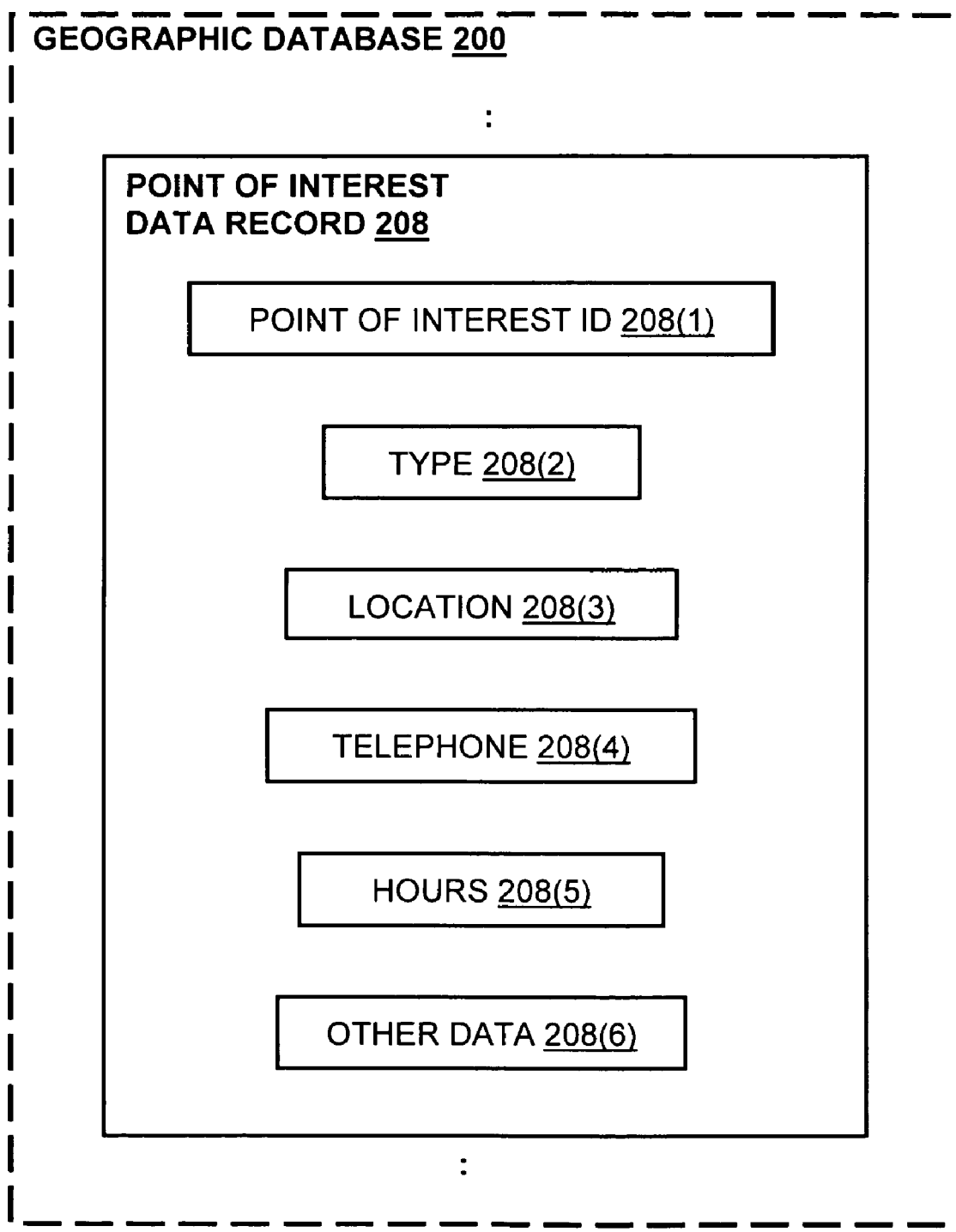
FIG. 4 is a block diagram of point of interest data records contained in the geographic database depicted in FIG. 2, according to an exemplary embodiment.

FIG. 4 shows some components of a point of interest data record 208 contained in geographic database 200. The point of interest data 208 represent the various points of interest located in the geographic region 102. Points of interest include businesses, municipal buildings, historical markers, buildings, parking facilities, etc. The point of interest data 208 includes data representing features and attributes of the point of interest. In one embodiment, the point of interest data record 208 includes a point of interest ID 208(1) by which the data record can be identified in the geographic database 200. Each point of interest data record includes data attributes that relate to the represented point of interest. For example, each point of interest data record may include a type 208(2) (e.g., the type of point of interest, such as restaurant, hotel, city hall, police station, historical marker, ATM, golf course, parking garage, etc.). Each point of interest data record also includes the location of the point of interest 208(3). The data indicating the location of the point of interest 208(3) may include the latitude and longitude coordinates for nodes 206(1) and 206 (2), and/or reference to the road segment data record 204 on which the point of interest is located. The point of interest data record further includes a telephone number 208(4), hours of operation 208(5), and other data 208(6) that refer to various other attributes of the point of interest 208. In one embodiment, the point of interest data record provides a reference to a data record representing a parking facility, such as parking facility data record as described below. For this embodiment, the point of interest is associated with certain parking facilities located proximate the point of interest indicating that the parking facilities serves as parking for the point of interest. For example, a parking facility may provide parking spaces for a retail store.

In the embodiment of FIG. 5, the point of interest data 208 relates to a parking facility. For convenience, the point of interest data record representing a parking facility will be referred to as a parking facility data record 250. The parking facility data record 250 includes an ID 250(1) by which the data record can be identified in the geographic database 200. Each parking facility data record 250 has associated with it information (such as "attributes", "fields", etc.) that describes features of the represented parking facility. The parking facility data record 250 may include data 250(2) that indicates a type of parking facility, such as covered or uncovered garage, above ground or below ground garage, open lot, and so on. The parking facility data record 250 includes data 250(3) indicating a name of the parking facility and data 250(4) indicating the location of the parking facility. The data indicating the location of the parking facility 250(4) may include the latitude and longitude coordinates, and/or reference to the road segment data record 204 on which the parking facility is located. The parking facility data record further includes a telephone number of the parking facility 250(5) and hours of operation 250(6) of the parking facility. For example, the hours of operation may include the starting hour of operations, the ending hour of operations, hours of parking validity, etc.

The parking facility data record 250 further includes data indicating a cost 250(7) associated with the parking facility. For example, the data indicating cost 250(7) may include duration of parking (including parking start time and parking end time), an hourly rate, a flat rate, etc. The data indicating cost 250(7) may include conditions when the cost changes. The data indicating cost 250(7) may also include accepted currency and payment method (such as accepted credit cards, currency, etc.). The parking facility data record further includes a total number of parking spaces 250(8) or capacity of the parking facility and amenities 250(9) provided by the parking facility. The amenities 250(9) provided by the parking facility may include attendant on duty, valet services, ATM, change availability, etc.

The parking facility data record 250 also includes historic parking data 250(10) associated with the parking facility. The historic parking data 250(10) indicates parking availability for the parking facility based on past occupancy of the parking facility. The collection and modeling of historic parking data will be described below. The parking availability may be represented as a number of parking spaces available, an availability percentage (spaces available as a percentage of the total number of parking spaces), occupancy percentage (spaces filled as a percentage of the total number of parking spaces), a word rating occupancy (full, near full, open) or any other indication of parking availability. The historic parking data 250(10) may include parking availability based on the day of the week and the time of the day. For example, the historic parking data 250(10) may include the parking availability for the parking facility for week days (Monday through Friday) during business hours (8 AM until 5 PM). The historic parking data 250(10) may also include parking availability based on the time of year and/or weather. For example, during winter months, parking facilities with covered garages may operate near 100 percent capacity for the week during business hours. The same parking facilities may operate near 50 percent capacity during other time periods. The historic parking data 250(10) may further include parking availability based on events such as sports, shows, conventions, etc. For example, the parking availability for parking facilities near an event on a given day may decrease.

The parking facility data record 250 may also include other data 250(11) that refer to various other attributes of the parking facility. For example, the other data 250(11) may include data indicating special needs like parking for over-sized campers or automobiles with trailers, motorcycles, handicap access, etc. The other data 250(11) may provide the location of entrances, exits, elevators and parking zones/levels each with corresponding names. The other data 250(11) may further include restrictions for the parking facility due to events, traffic, weather, etc. In one embodiment, the other data 250 (11) provides a reference to a point of interest data record 208. For this embodiment, the parking facility is associated with certain points of interest located proximate the parking facility indicating that the parking facility serves as parking for the point of interest. For example, a parking facility may provide parking spaces for a retail store.

II. Collection and Modeling of Parking Data

A. Collection of Parking Data

Figure 6:
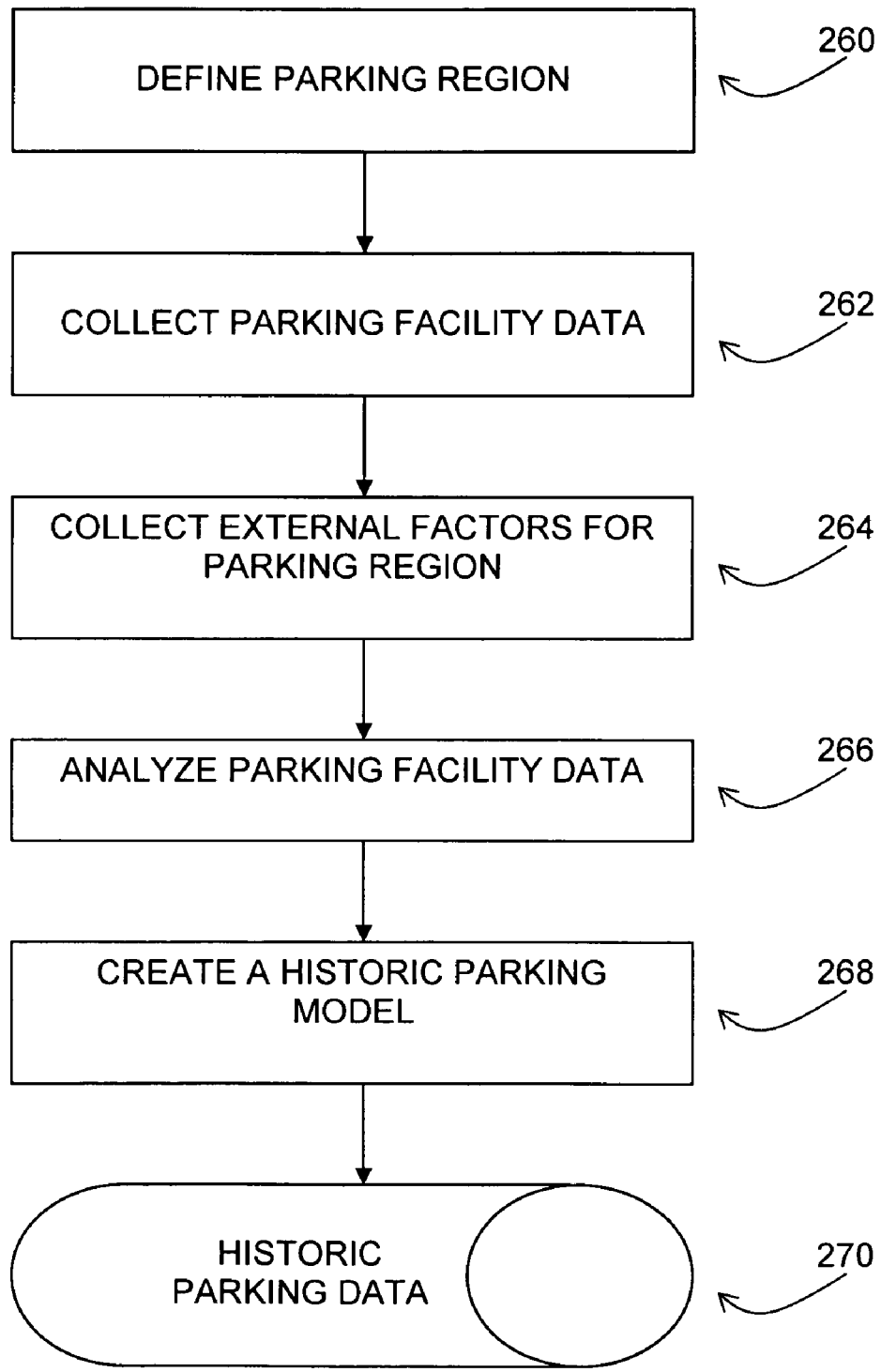
FIG. 6 is a flow chart for collecting parking information, according to an exemplary embodiment.

FIG. 6 is a flow chart that illustrates the step for collecting parking data, according to an exemplary embodiment. At step 260, a geographic researcher defines a parking region within geographic region 102. The parking region is defined as a bounded area located within the geographic region 102. The parking region may include one or more road segments 110 in the road network 108. The parking region may be of any size and/or shape. For example, the parking region may be a city, a portion of a city, neighborhood, administrative district and so on. In one embodiment, the parking region includes at least one parking facility. The parking facility may include a parking garage, a parking lot, metered parking, street parking, and any other type of parking for a vehicle.

At step 262, the geographic researcher collects data for the parking facilities located within the parking region. In one embodiment, the geographic researcher collects features or attributes for each of the parking facilities. For each of the parking facilities, the geographic researcher identifies a type of parking facility, such as covered or uncovered parking garage, above ground or below ground parking garage, open parking lot, metered street parking, restricted street parking, and so on. For each of the parking facilities, the geographic researcher collects a name of the parking facility and location of the parking facility. The data indicating the location of the parking facility may include the latitude and longitude coordinates and/or street address. The geographic researcher may also collect a telephone number of the parking facility, hours of operation of the parking facility, a cost associated with the parking facility, a total number of parking spaces or capacity of the parking facility, and amenities provided by the parking facility, such as attendant on duty, valet services, ATM, change availability, and so on. Additionally, the geographic researcher may collect any other information regarding the parking facility.

The geographic researcher also collects data representing the parking availability and/or occupancy for the parking facilities at various times. For example, the geographic researcher collects information representing the parking availability and/or occupancy for the parking facilities at various times of the day, days of week, and months of the year and so on. The geographic researcher may collect the availability information by direct observation or through automated collection with sensor devices or through occupancy records maintained by the owner of the parking facility. In one embodiment, sensor devices proximate the parking spaces identify available or occupied parking spaces at the parking facility and communicate with a controller that maintains a number of available or occupied parking spaces at the parking facility. In another embodiment, a sensor device may identify a number of vehicles entering and exiting a parking facility and communicate with a controller that maintains the number of available or occupied parking spaces at the parking facility. Examples of sensor devices include electromagnetic sensors, optical sensors, cameras, radar or any other appropriate sensor device. The controller may be a computing platform that receives information from the various sensor devices via hard wiring or wireless communications.

In another embodiment, the geographic researcher may collect the parking availability information from government and/or commercial sources which own and/or operate one or more parking facilities. For example, the operator of the parking facility may maintain records indicating occupancy rates and payments received at various times of the day for different days of the week, month and year. Additionally, the operator of the parking facility may maintain records indicating times and dates when the parking facility was full with no available parking spaces.

In order to establish a pattern of past parking availability for the parking facility, parking availability information is collected over a period of time, such as for several weeks, months, years or any other time period. Additionally, the parking availability information may be collected in different time increments, such as fifteen minutes, thirty minutes, an hour, or any other increment. The granularity (time increments) for collecting parking availability information may vary according to the time of day, the day of week, or any other factor. For example, parking availability information may be collected more often, or in smaller time increments when the parking availability is rapidly changing (e.g. during peak hours), and less often, or in larger time increments when parking availability changes less frequently, or is in a steady-state (e.g. during off-peak hours).

In one embodiment, the geographic researcher collects and/or organizes the parking availability information in a format illustrated in Table I or other formats.

TABLE I

| Facility ID | Time | Date | Event | Status | Available | Capacity |
|---|---|---|---|---|---|---|
| 01233 | 08:45 AM | Sep. 01, 2005 | None | Spaces | 15 | 200 |
| 01233 | 09:00 AM | Sep. 01, 2005 | None | Spaces | 3 | 200 |
| 01233 | 09:15 AM | Sep. 01, 2005 | None | Full | 0 | 200 |
| 01234 | 08:00 AM | Sep. 01, 2005 | Rain | Spaces | 15 | 50 |

As shown in Table I, each parking facility includes a unique identifier by which the facility can be identified. Table I includes information indicating a time and date of the parking availability information stored in the rows of Table I. Additionally, Table I includes an indication of the status of the parking facility as either having spaces available or full without spaces available. Furthermore, Table I includes a number of available parking spaces and the total capacity for each parking facility. In another embodiment, the parking availability information may include the percentage of occupancy as the number of occupied parking spaces versus the total capacity for each parking garage. Other parking availability information may also be included in Table I, such as a day of week corresponding to the date and any other information regarding the parking facility.

In an alternative embodiment, the geographic researcher also collects the general location of the empty parking spaces when collecting parking availability information. For example, the researcher may identify that at 9:00 AM the empty spaces of a parking garage are located on the upper floors, and the empty spaces at 6:00 PM are located throughout the garage.

Referring to FIG. 6, step 264, the geographic researcher collects external factors for each parking region that existed at times approximately corresponding to times of collected parking availability information. The external factors are events that may affect the parking availability. For example, the external factor of rain may affect parking availability by decreasing the number of parking spaces for a given day. External factors may include the time of year, national vacation days, bank holidays, season, weather, street parking restrictions, and so on. The external factors may also include events such as conventions, shows, exhibits, sports, parades, popular entertainment and so on. In one embodiment, the geographic researcher collects the date, time period and type of the external factor. The recorded external factors may be correlated with the parking availability information as shown in Table I which includes a column indicating the external factor of events. For example, the last row of Table I includes the external factor of rain. The external factors may be collected by direct observation or from third-party sources, such as websites, newspapers, theater and convention center records and so on.

Referring to FIG. 6, the geographic researcher defines other parking regions and collects data for the parking facilities located within the other parking regions in a similar manner as discussed above. Additionally, the information collected indicates features or attributes for the parking facilities and parking availability information for the parking facilities.

B. Modeling Parking Data

The geographic researcher supplies the data representing the parking facilities, including parking availability information at different times, to a central data collection facility operated by a geographic database provider. According to one embodiment, the geographic database provider maintains and updates the geographic database 200. The central data collection facility acquires data representing the parking facilities from the geographic researchers by any communication means, such as wireless data transmission, internet communication, sending a diskette or hard drive or any other method. In another embodiment, the central facility may obtain the data representing the parking facilities from other sources such as directly from parking facility sensor devices and/or directly from operators of the parking facilities. The central facility stores the data representing the parking facilities including parking availability information on a storage medium such as a hard drive associated with a computing platform at the central facility.

At step 266 of FIG. 6, the data representing the parking facilities collected in steps 262 and 264 for the parking facilities is analyzed. The geographic database provider uses the data representing the parking facilities to create and/or update the parking facility data records 250 shown in FIG. 5. In one embodiment, the data representing the parking facilities is analyzed using the computing platform to obtain the features and attributes of the parking facilities. For example, the geographic database provider uses the data indicating type, name, location, telephone number, hours of operation, cost, number of parking spaces and amenities of the parking facility to create and/or update the attributes of the parking facility data record 250 representing the parking facility.

Additionally, the geographic database provider uses the collected parking availability information to create and/or update the historic parking data 250(10) of the parking facility data record 250. The parking availability information for one or more parking facilities may be extracted from the raw data representing the parking facility, converted into a common format and stored in a database allowing the data to be more easily analyzed. For example, all of the collected parking availability information for one of the parking facilities may be placed into a format indicating a parking facility ID, a number of available spaces according to a day of week, a time of day and event(s), if any.

In one embodiment, the parking availability information for one of the parking facilities is analyzed to identify a pattern in the collected parking availability information that indicates a pattern of past occupancy at the parking facility. For example, the parking availability information indicates that on the majority of Mondays at 9:00 AM, when no external factors occur, there were approximately 15 parking spaces available at the parking facility. That is, the past parking availability on a Monday at 9:00 AM was approximately 15 parking spaces.

In one embodiment, statistical analysis is performed on the collected parking availability information for the parking facility to determine past parking availability at specific times and day of the week. For example, the average number of spaces available on Tuesdays at 10:00 AM may be computed. Additionally, the analysis removes outlier information that is more than a predetermined number of standard deviations from the average. Furthermore, interpolation and extrapolation may be used to determine the past parking availability when no data at the specified time is available. Moreover, any other statistical analysis may be used to determine the past parking availability using the collected parking availability information.

Referring to FIG. 6, a historic parking model for each parking facility is created using the collected parking availability information at step 268. The historic parking model for the parking facility is based on the analyzed collected parking availability information. In one embodiment, the geographic database provider uses the historic parking model(s) for the parking facility as a source for the historic parking data 250 (10) of the parking facility data record 250.

Table II illustrates one embodiment of a format for the historic parking model of a parking facility.

TABLE II

| Day | 7:00 | 7:15 | 7:30 | 7:45 | 8:00 | ... | 12:00 | 12:15 | 12:30 |
|---|---|---|---|---|---|---|---|---|---|
| Mon | 30 | 25 | 20 | 10 | 10 | ... | 8 | 9 | 10 |
| Tues | 27 | 25 | 20 | 15 | 10 | ... | 10 | 10 | 10 |
| Wed | 29 | 20 | 15 | 15 | 10 | ... | 10 | 10 | 15 |
| Thurs | 30 | 20 | 20 | 15 | 10 | ... | 11 | 10 | 10 |
| Fri | 30 | 25 | 20 | 10 | 9 | ... | 10 | 10 | 10 |
| Sat | 50 | 50 | 50 | 50 | 50 | ... | 30 | 30 | 30 |
| Sun | 50 | 50 | 50 | 50 | 50 | ... | 35 | 35 | 35 |

As shown in Table II, the historic parking model provides the past parking availability as a number of spaces available for the parking facility at times of the day and days of the week. For example, the historic parking model indicates that the past parking availability on a Wednesday at 8:00 AM was approximately 10 parking spaces. In one embodiment, the model provides the number of available parking spaces in fifteen minute increments for each day of the week. In an alternative embodiment, the model may provide the number of available parking spaces in increments other than fifteen minutes. For example, the model may provide parking spaces available in varying increments as the day progresses. The data may be provided in hourly increments during periods of the day when parking availability is in a steady-state, or changes infrequently, such as after rush hour or on the weekends. The model may indicate trends in the parking availability for the parking facility. For example, during the hours between 8 AM and 5 PM the parking availability may remain constant. As shown in Table II, the model providing historic parking data provides the number of parking spaces available at the indicated time. The model may also provide the percentage of occupancy, the number of occupied spaces versus the total capacity, a word rating for availability (such as full, nearly full, empty) or any other parking related data. Additionally, the model may also indicate trend (increasing, decreasing or static) of the parking availability at the parking facility at the specified times. For example, the model may indicate that at 7 AM, when the parking facility is filling, the availability is decreasing; similarly, the model may indicate that at 5:30 PM, when the parking facility is emptying, the availability is increasing. Furthermore, the model may also indicate the general location of the empty parking spaces such as at 8:00 AM the empty spaces of a parking garage are located on the upper floors.

Figure 7:
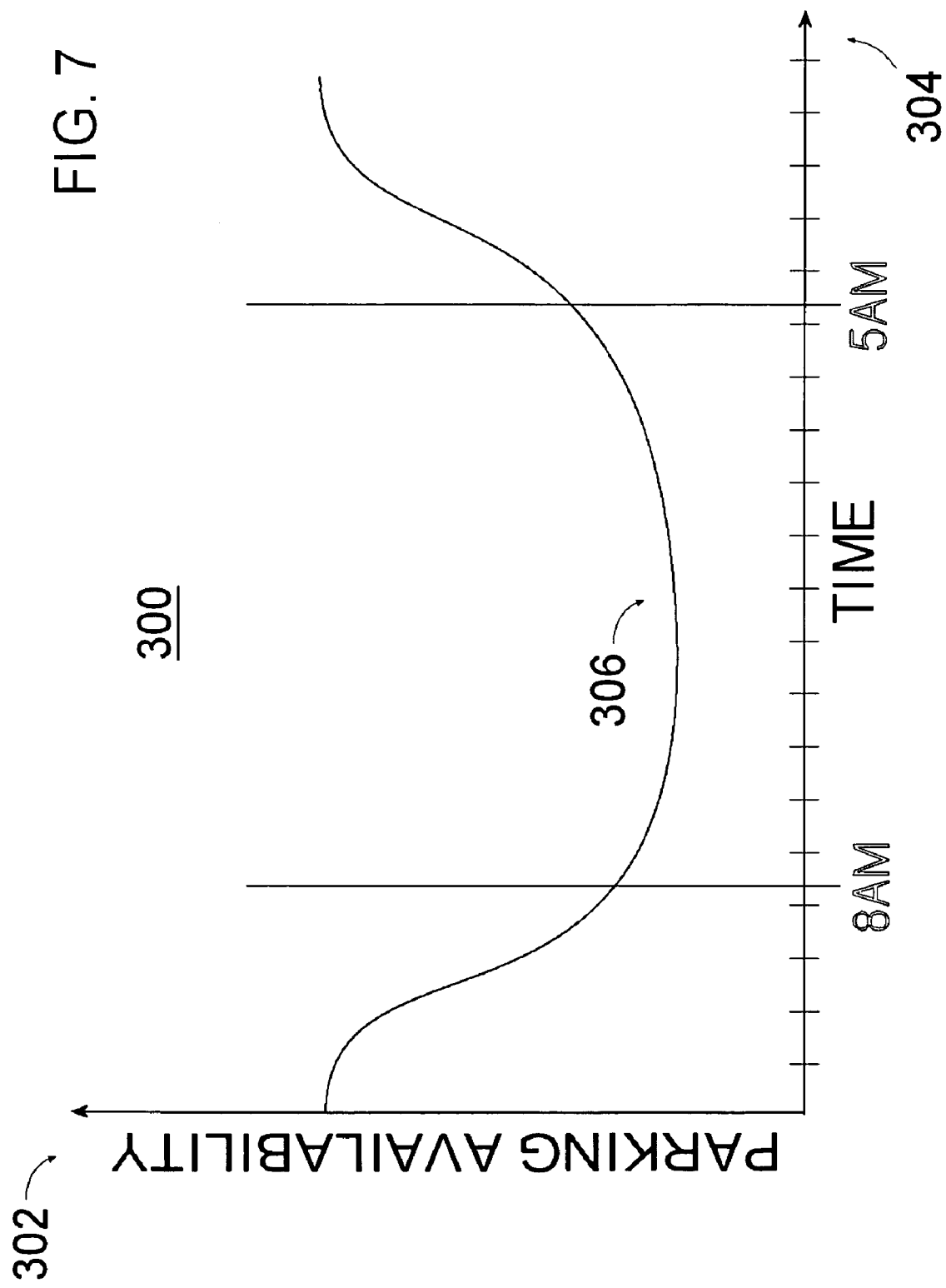
FIG. 7 is a graph representing historic parking availability information.

In another embodiment, the historic parking model for the parking facility is a graph 300 as shown in FIG. 7. According to FIG. 7, the past parking availability 302 varies as a function of time 304. In one embodiment, the parking availability 302 includes the number of available parking spaces for the parking facility at a given time 304. The graph 300 provides a curve 306 indicating the parking availability 302 for any time 304 during the day. For example, the graph 300 provides the past parking availability at very fine time increments, such as 8:11 AM, 8:12 AM, 8:13 AM and so on. In another embodiment, the historic parking model is an equation representing the curve 306 of graph 300.

The historic parking model is created using the analyzed collected parking availability information. In one embodiment, various statistical modeling techniques or statistical distributions (e.g. Gaussian) or both are used to create the model. For example, the collected parking availability information is modeled for each timeslot (after first removing outliers) by the mean or average and its standard deviation. In an alternate embodiment, instead of using the mean to compute the number of open spaces, the median is used. Alternatively, curve fitting techniques provide the historic parking model with parking availability varying as a function of time.

In one embodiment, more than one historic parking model defines the past parking availability at the parking facility. One of the models may represent weekdays while another model represents weekend days. Additionally, one model may represent the entire year or multiple models may represent the year with one model per season, one model per month and so on.

In one embodiment, the model is an unbiased historic parking model that represents past parking availability without any external factors. That is, the statistical analysis used to derive the historic parking model considered raw collected parking availability information that did not include any external factors or the effects of external factors on past parking availability were removed by the analysis. As mentioned above, the collected parking availability information recorded any external factors, such as weather, events and holidays. In one embodiment, separate models considering external factors override or alter the unbiased historic parking model. For example, separate historic parking models are statistically modeled for each distinct event (i.e. one for rain, another for public holidays, another for football games, and so on). These models may be dynamically combined to represent past parking availability when several external factors converge (e.g. averaging past parking availability from the two historic models providing rain and public holiday when those two events (external factors) are present simultaneously).

In another embodiment, data representing the effect on past parking availability caused by external factors is modeled and stored as an influence factor. The influence factor represents how the external factor influences the unbiased historic parking model. In one embodiment, the influence factor is a percentage change in past parking availability. The influence factor may apply to all parking facilities in the parking region, or the influence factor may differ according to parking facility or by any other means, such as distance from the event (e.g. football stadium). For example, the influence factor may affect the past parking availability (e.g. decrease parking availability by 70% for the external factor event "football game"). The historic parking model may include rules for how to combine influence factors from various external factors. For example, the influence factors from the external factors "public holiday" and "football game" may cause a 50% increase and a 70% decrease in parking availability, respectively. The rule for obtaining the combined influence factor may be $f=(1+0.50)*(1-0.70)=0.65$, or parking availability decreases by 35% when external factors "public holiday" and "football game" are present.

The influence factors and how they are combined may also vary by time of day or day of week, and so on. For example, the influence factor for rain may be less in the morning since rain may delay cars reaching the parking facilities (i.e. they may fill up slower), and in the evening the parking facilities may remain occupied longer since increased traffic, due to rain, delays cars trying to leave parking facilities.

Referring to FIG. 6, the historic parking models 270 for the parking facilities are stored in a database on a storage medium at the central facility. The geographic database provider uses the historic parking models to create and/or update the historic parking data 250(10) of the parking facility data records 250. In one embodiment, the historic parking models are stored as the historic parking data 250(10). For example, the historic parking model having the format illustrated in Table II is used as the historic parking data 250(10). In another embodiment, the historic parking data 250(10) is generated from the historic parking model. For example, the historic parking data 250(10) may provide the past parking availability at hour increments which is generated from the historic parking model such as from the graph shown in FIG. 7. In a further embodiment, equations representing the past parking availability generated from the historic parking models are stored as the historic parking data 250(10). The influence factors may also be included for the historic parking data 250(10).

After generating the historic parking data for the parking facilities, the historic parking data and other data are stored in a master copy of the geographic database 200. The historic parking data may be stored as an attribute to the parking facility data record. In an alternative embodiment, the historic parking data is stored in a separate database from the master copy of the geographic database 200. For example, the historic parking data may be stored in a parking database that includes data representing parking facilities in the geographic region. In one embodiment, the data of the separate parking database is associated with data of the geographic database. For example, the road segment, node, point of interest and/or parking facility data records of the geographic database 200 may reference data of the parking database, such as the historic parking data. Additionally, data representing the parking facilities in the parking database may reference data in the geographic database 200, such as information indicating location.

The geographic database with new or improved historic parking data and other data can be used to make derived database products. The derived database products may include only portions of all the data in the master version of the database 200. For example, the derived database products may include data that relate to only one or more specific regions. The derived database products may be used on various kinds of computing platforms. For example, the derived database products may be used in navigation systems (such as in-vehicle navigation systems and hand-held portable navigation systems), personal computers (including desktop and notebook computers), and other kinds of devices (such as pagers, telephones, personal digital assistants, and so on). Derived database products may also be used on networked computing platforms and environments, including the Internet. Moreover, the derived database product may be supplied to providers of navigation-related services, such as a navigation services provider, internet services provider, or any other providers.

The derived database products may be in a different format than the format in which the master copy of the database is maintained. The derived database products may be in a format that facilitates the uses of the derived products in the platforms in which they are installed. The derived database products may also be stored in a compressed format on the media on which they are located.

III. Navigation System

A. Overview

Figure 8:
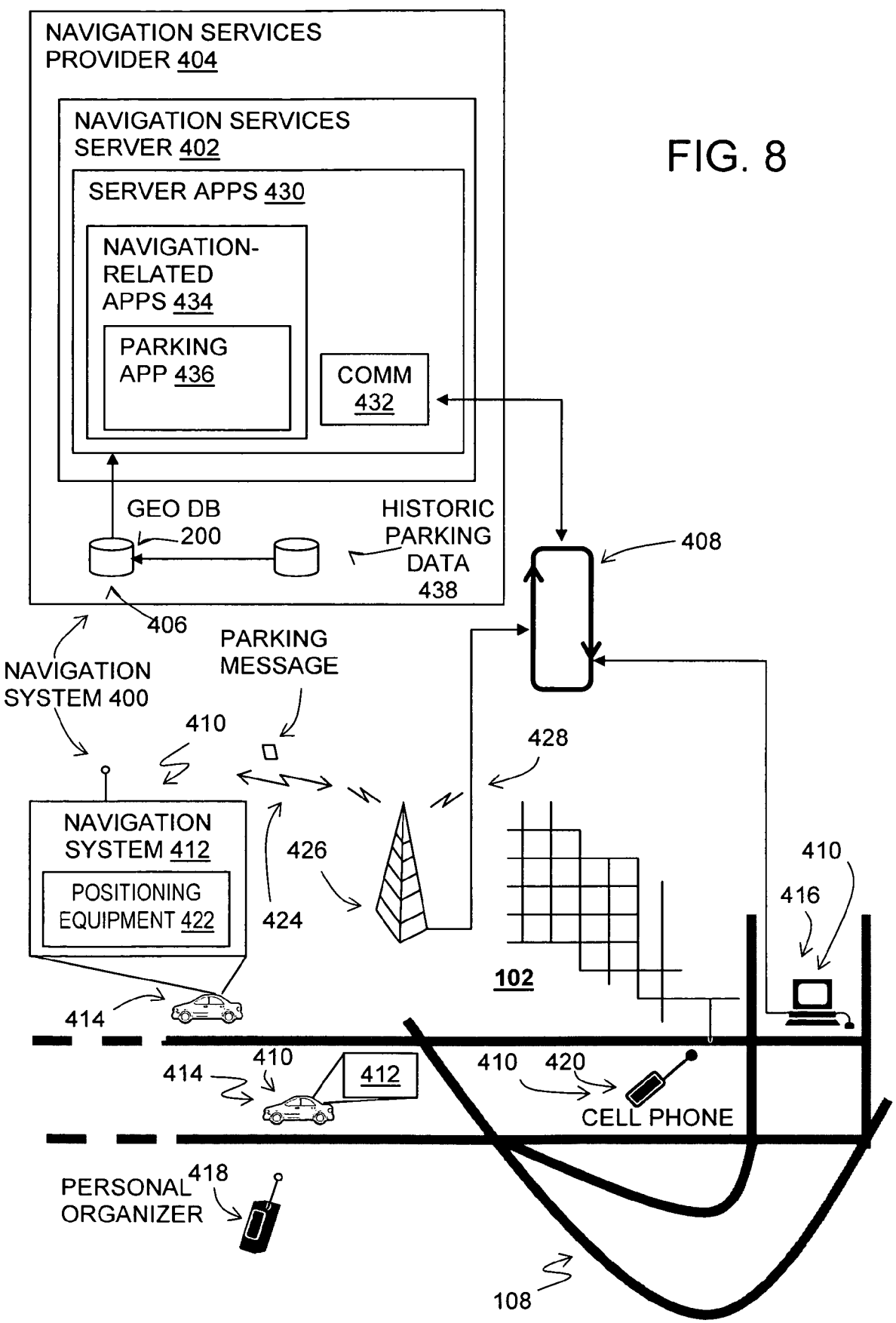
FIG. 8 is a block diagram of components of a navigation system, according to an exemplary embodiment.

FIG. 8 shows the geographic region 102 and a portion of the road network 108. A navigation system 400 serves end users (e.g., vehicle drivers and passengers, as well as other persons) in the geographic region 102. The navigation system 400 is used by the end users to obtain navigation-related services with respect to the geographic region 102. The navigation-related services include information about travel along the road network 108, including route calculation and guidance, people and business finding services (e.g., electronic yellow and white pages), maps, point of interest searching, destination selection, and so on.

The navigation system 400 is a combination of hardware, software and data. The navigation system 400 includes remote components (i.e., hardware, software or data located at a central location that is remote from the end users) and local components (i.e., hardware, software, or data located physically with each end user). Included among the remote components of the navigation system 400 is a navigation services server 402. The navigation services server 402 includes appropriate computer hardware and software to run network applications. The navigation services server 402 is maintained and operated by a navigation services provider 404.

Associated with the navigation services server 402 is the geographic database 200. The geographic database 200 is stored on a storage medium 406 that is accessible to the navigation services server 402. The storage medium 406 may include one or more hard drives or other storage media. The geographic database 200 may be organized to facilitate performing navigation-related functions. In one embodiment, the geographic database 200 is developed by NAVTEQ North America, LLC of Chicago, Ill. However, it is understood that the inventive concepts disclosed herein are not restricted to any particular source of data.

The local components of the navigation system 400 include the various computer platforms 410 operated by the end users to request and obtain navigation-related and map-related features and geographic data from the navigation services provider 404. These various computer platforms 410 (also referred to as "end user computing platforms" or "client computing platforms") may include navigation system units 412 located in vehicles 414, personal computers 416, personal organizers (e.g., PDAs) 418, wireless phones 420, or any other types of computing devices that have the appropriate hardware and software to access the navigation services provider 404 over a data network 408. Referring to the embodiment of FIG. 8, some of the end user computing platforms 410 include positioning equipment 422. The positioning equipment 422 may include a GPS system, inertial sensors, wheel pulse sensors, etc. Using this positioning equipment 422, the position of the end user's computing platform 410 can be determined.

The data network 408 may use any suitable technology and/or protocols that are currently available, as well as technology and/or protocols that become available in the future. The data network 408 may be part of, or connected to, the Internet. A portion of the network 408 may include a wireless portion 424. The wireless portion 424 of the data network 408 enables two-way communication between the mobile end user computing platforms 410 and the service provider 404. The wireless portion 424 may be implemented by any suitable form of wireless communication, including cellular, PCS, satellite, FM, radio, or technologies that may be developed in the future. The wireless portion 424 may include one or more transmitters 426, such as a transponder tower, an antenna tower, an FM tower, satellites, or other suitable means. The transmitters 426 include an appropriate communication link 428 to the network 408 and/or service provider 404. The transmitters 426 include suitable technology that enables two-way communication between the service provider 404 and the end user computing platforms 410.

Referring to FIG. 8, server applications 430 are included on the navigation services server 402 of the navigation services provider 404. The server applications 430 may be stored on one or more hard drive(s) or other media operated by the server 402 and loaded into a memory of the server 402 to run. One of the server applications 430 is a communications application 432. The communications application 432 interfaces with the data network 408 in order to receive messages from and send messages to the end users.

Included among the server applications 430 are navigation-related applications 434. The navigation-related applications 434 use the geographic database 200 associated with the navigation services server 402 in order to provide the various different types of navigation-related services. In order to provide navigation-related features, the navigation-related applications 434 use data from the geographic database 200.

One of the navigation-related applications 434 is route calculation. The route calculation application receives an end user request to calculate a route to a desired destination. The request includes an identification of a starting location and the desired destination location. Given the starting location and the destination location, the route calculation application accesses the geographic database 200 and obtains road segment data entities 204 that represent segments around and between the starting location and the destination location. Using the geographic data, the application determines a solution route comprising a series of connected segments over which the end user can travel from the starting location and the destination location. The route calculation application may use any of various means or algorithms for this purpose. Any suitable route calculation method now known or developed in the future may be employed.

Another of the navigation-related applications 434 on the navigation services server 402 is a route guidance application. The route guidance application provides maneuver instructions for the end user to travel on the calculated route. In one embodiment, the route guidance application uses the series of connected road segments determined by the route calculation application, as well as additional information from the geographic database 200, to provide instructions to the end user to travel the route. The route guidance application may include applications that identify locations along the calculated route at which maneuvering instructions may be provided to the end user. The route guidance application may provide the maneuvering instructions to the end user all at once, or alternatively, the route guidance application may provide the maneuvering instructions one at a time. The maneuvering instructions are provided to the end user through a user interface included on the computing platform 410. The output of the route guidance may be conveyed audibly through speech synthesis or displayed on graphical maps on the user interface.

Further navigation-related applications 434 on the navigation services server 402 include business finding services (e.g., electronic yellow and white pages), point of interest searching and destination selection. The end user may request the business finding service by providing a business category and a proximate desired location. For example, the user may request the closest gas station. Using the given business category and current location of the end user, the business finding application accesses the geographic database 200 and obtains point of interest data records 208 to identify one or more candidate businesses. The application also accesses the geographic database 200 and obtains road segment data entities 204 to determine travel distance to the candidate businesses. After identifying the desired business, the application provides the end user with information regarding the business. In one embodiment, a graphical map illustrating the desired business(s) is displayed on the user interface.

B. Navigation-Related Services Using Historic Parking Data

While providing the navigation-related services and features to the end users, the navigation services provider 404 may provide parking availability information. Parking availability may affect how the end users travel to the destination location. For example, the unavailability of parking could cause the end user to route to an alternate destination. Included among the server applications 430 on the navigation services server 402 is a parking application 436. In one embodiment, the parking application 436 provides parking availability information based on historic parking data for parking facilities located in geographic region 102. To provide parking availability information to the end user, the parking application 436 accesses the geographic database 200 and historic parking data 438. The historic parking data 438 may be included in the geographic database 200 or may be part of a separate database.

Historic parking data 438 is established as discussed above. In one embodiment, the historic parking data 438 is used to estimate the current parking availability and/or to estimate the parking availability for a time in the future. The historic parking data 438 provides a likely estimate of current parking availability based on analyzed and modeled past parking availability. The historic parking data 438 provides an alternative solution when real-time parking data is not available or the system is not capable of obtaining or processing real-time parking data. Real-time parking data indicates the measured current parking availability, such as just measured parking availability and parking availability that was measured a short time prior to the current time, such as thirty to fifteen minutes. The historic parking data 438 may also be useful when real-time parking data is available because historic parking data 438 may provide the likely parking availability at some estimated future time of arrival at the destination whereas the real-time parking data may not be as reliable to estimate the future parking availability.

Figure 9:
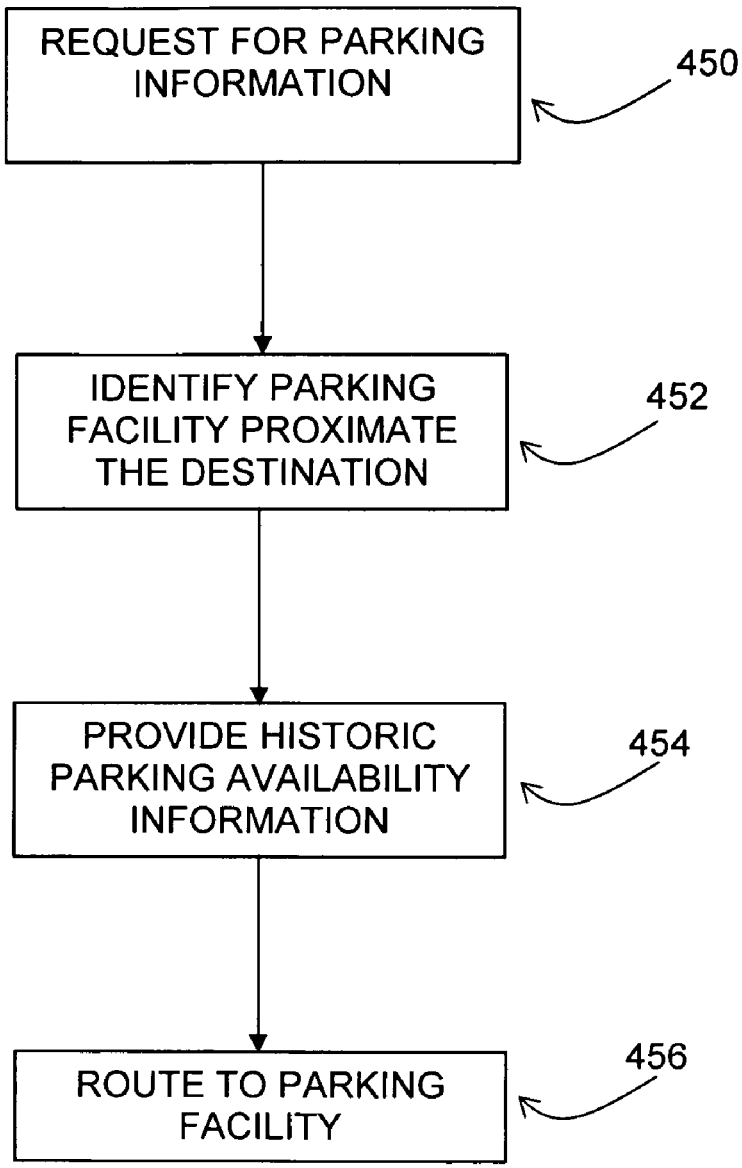
FIG. 9 is a flow chart for providing a navigation-related service using parking availability information.

FIG. 9 is a flowchart for one embodiment of a navigation-related service using the parking application 436. In the present embodiment, the end user needs information regarding parking availability and parking facilities proximate his or her desired destination location. The end user makes a request to the navigation services provider 404 for parking information at step 450. The parking application 436 receives the parking information request along with the destination location provided by the end user. The end user may provide the destination location in terms of a point of interest name or category, an address, intersection, neighborhood or any other indication of the destination.

At step 452, the parking application 436 identifies parking facilities within a predetermined distance of the desired destination. In one embodiment, the predetermined distance or search radius from the destination is defined by the navigation services provider 404. The radius from the destination location may also be specified by end user. Furthermore, the size of the search radius may be dictated by external factors, such as weather and time of day. For example, the parking application 436 uses a smaller search radius during poor weather and late at night. Additionally, other factors may be considered when identifying parking facilities. For example, the type of parking facilities identified may correspond to established end user preferences. For example, the end user may specify a preference for covered garages. Using the destination, established search radius and data from the geographic database 200, the parking application 436 identifies one or more parking facilities within the predetermined distance proximate the destination location.

The parking application 436 also obtains historic parking data 438 indicating past parking availability at each of the identified parking facilities. In one embodiment, the parking application 436 estimates a time of arrival at the desired destination using the end user's current location and current traffic information, if available. In another embodiment, the time of arrival may be included in the request from the end user. The parking application 436 retrieves past parking availability information for the parking facilities from the historic parking data 438 corresponding to the time of arrival, date or day of week and any external factors. The past parking availability information for the parking facilities provide a likely estimate of current parking availability based on past parking patterns.

The navigation services provider 404 via the communication application 432 provides the end user with information indicating the location of each of the identified parking facilities proximate the destination and historic parking availability for the identified parking facilities at step 454. The parking availability may be presented as a number of spaces available compared to total spaces at the facility and trend, such as 25 out of 100 spaces are available with availability decreasing. The end user obtains the parking information via a user interface, such as a map display that illustrates the parking facilities' locations and availability.

Upon reviewing the parking information, the end user selects one of the available parking facilities from the provided information. In one embodiment, the end user then requests the navigation services provider 404 to provide a route to the selected parking facility. At step 456, the navigation services provider 404 provides the end user a route to the selected parking facility in the manner discussed above. In another embodiment, the navigation services provider 404 may also provide route guidance to the selected parking facility. In a further embodiment, the navigation services provider 404 makes a reservation at the selected parking facility for the end user. Additionally, the navigation services provider 404 may also indicate the general location of the empty parking spaces such as at 9:00 AM the empty spaces of a parking garage are located on the upper floors.

IV. Alternatives

A. Alternative Navigation-Related Service Using Historic Parking Data

Figure 10:
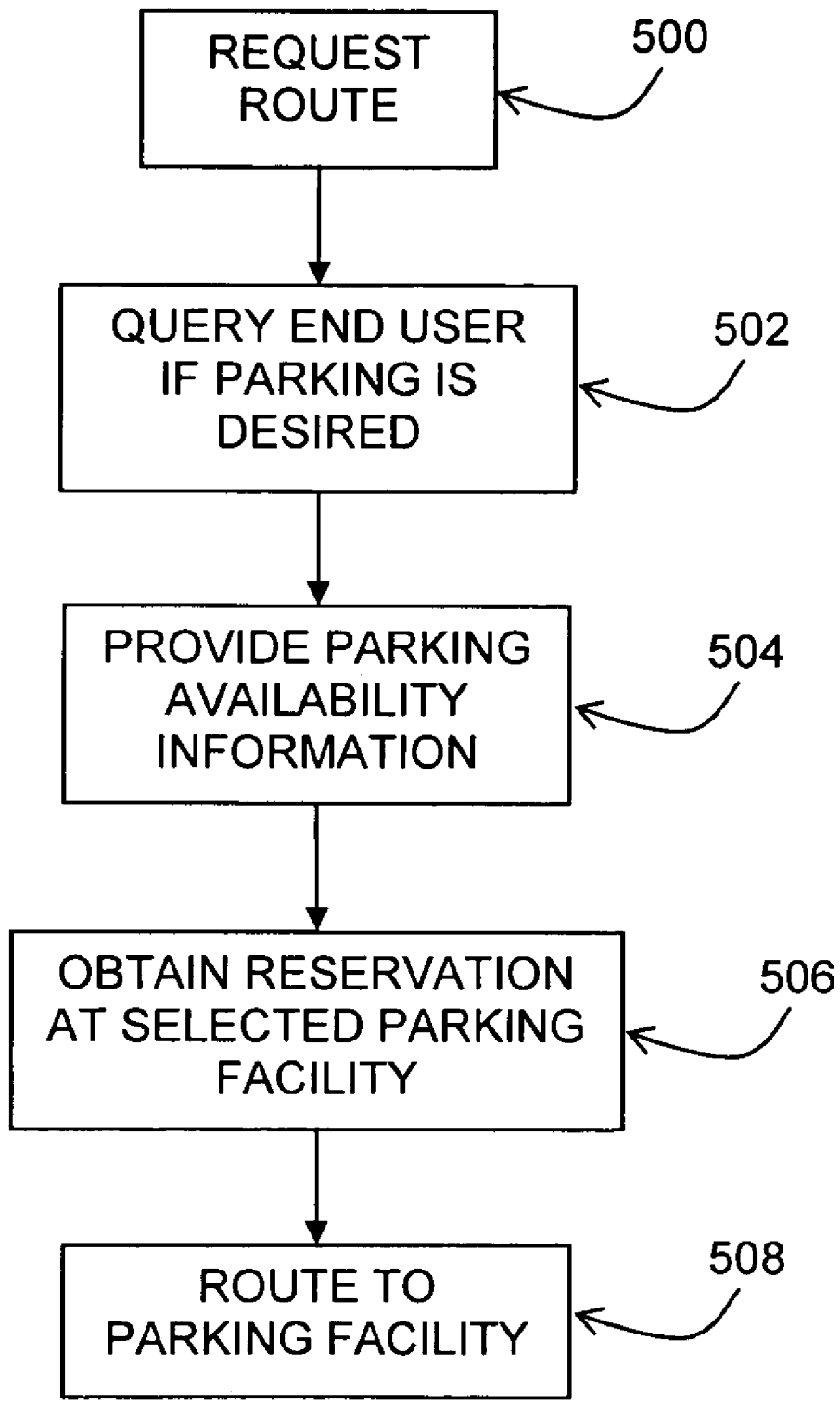
FIG. 10 is a flow chart for providing a navigation-related service using parking availability information to end users moving in a geographic region.

In one embodiment, as the end user approaches his or her known destination, the navigation services server 402 provides parking availability information to the end user. FIG. 10 is a flowchart of the operations of the navigation services server 402 for providing parking availability information to end users according to one embodiment. At step 500, the end user makes a request to the navigation services provider 404 for a route to a destination location, and the navigation services provider 404 calculates a route to the destination in the manner discussed above. The end user is provided the calculated route and guidance information for following the route. As the end user travels along the calculated route, the end user periodically provides its current position to the navigation services provider 404.

When the end user's position is a predetermined distance from the destination, the navigation services provider 404 sends a query message to the end user at step 502. In another embodiment, the navigation services provider 404 sends the query message at a predetermined time amount prior to an estimated time of arrival at the desired destination. The query message asks the end user if he or she desires parking near the destination. If the end user declines the parking offer, the end user continues to follow the calculated route to the destination. If the parking information offer is accepted, the navigation services provider 404 receives an acceptance message and executes the parking application 436. In another embodiment, the navigation services provider 404 merely provides the parking information without the query message.

The parking application 436 identifies parking facilities within a predetermined distance of the destination. In one embodiment, the predetermined distance or search radius from the destination location is defined by the navigation services provider 404 or the end user. Using the destination, established search radius and data from the geographic database 200, the parking application 436 identifies one or more parking facilities proximate the destination location. The parking application 436 obtains historic parking data 438 indicating past parking availability at each of the identified parking facilities. In one embodiment, the parking application 436 estimates a time of arrival at the desired destination using the end user's current location and current traffic information, if available. The parking application 436 retrieves past parking availability information for the parking facilities from the historic parking data 438 corresponding to the time of arrival, date or day of week and any external factors.

The navigation services provider 404 via the communication application 432 provides the end user with information indicating the location of each of the identified parking facilities proximate the destination and historic parking availability for the identified parking facilities at step 504. In one embodiment, the parking information provided to the end user is limited to those parking facilities having availability. The end user obtains the parking information via a user interface. Upon reviewing the parking information, the end user selects one of the available parking facilities from the provided information and sends a message indicating the selection to the navigation services provider 404.

At step 506, the navigation services provider 404 makes a reservation at the selected parking facility, such as a parking garage, for the end user. In one embodiment, the navigation services provider 404 communicates with the operator of the parking facility and reserves a parking space at the facility for the end user. For example, the navigation services provider 404 generates an email or other type of communication that includes an identification of the end user and sends the request for the reservation to the operator of the selected parking facility. Upon receiving and processing the request for the reservation, the operator of the parking facility determines whether there is current parking availability, and if so, makes a reservation for the identified end user. The operator of the parking facility sends a reply communication to the navigation services provider 404 confirming the reservation with a confirmation code or denying the reservation for the end user. The navigation services provider 404 then provides the reservation confirmation code to the end user or recommends that the end user should select an alternate parking facility.

At step 508, the navigation services provider 404 provides a route to the selected parking facility. The navigation services provider 404 calculates a route from the current location of the end user to the selected parking facility and generates maneuver instructions for route guidance in the manner discussed above. The end user is provided the route and guidance information for traveling to the selected parking facility.

B. Standalone Navigation System

As explained above, there are different kinds of mobile and portable computing platforms that end users can use to obtain geographically-based features and services. These different kinds of mobile and portable computing platforms include standalone systems, such as in-vehicle navigation systems. With a standalone navigation system, the navigation application software and geographic database are located locally, i.e., with the navigation system unit in the vehicle or with the portable computer platform. The standalone systems are capable of performing navigation-related services including route calculation and guidance, people and business finding services (e.g., electronic yellow and white pages), maps, point of interest searching, destination selection, and so on.

Figure 11:
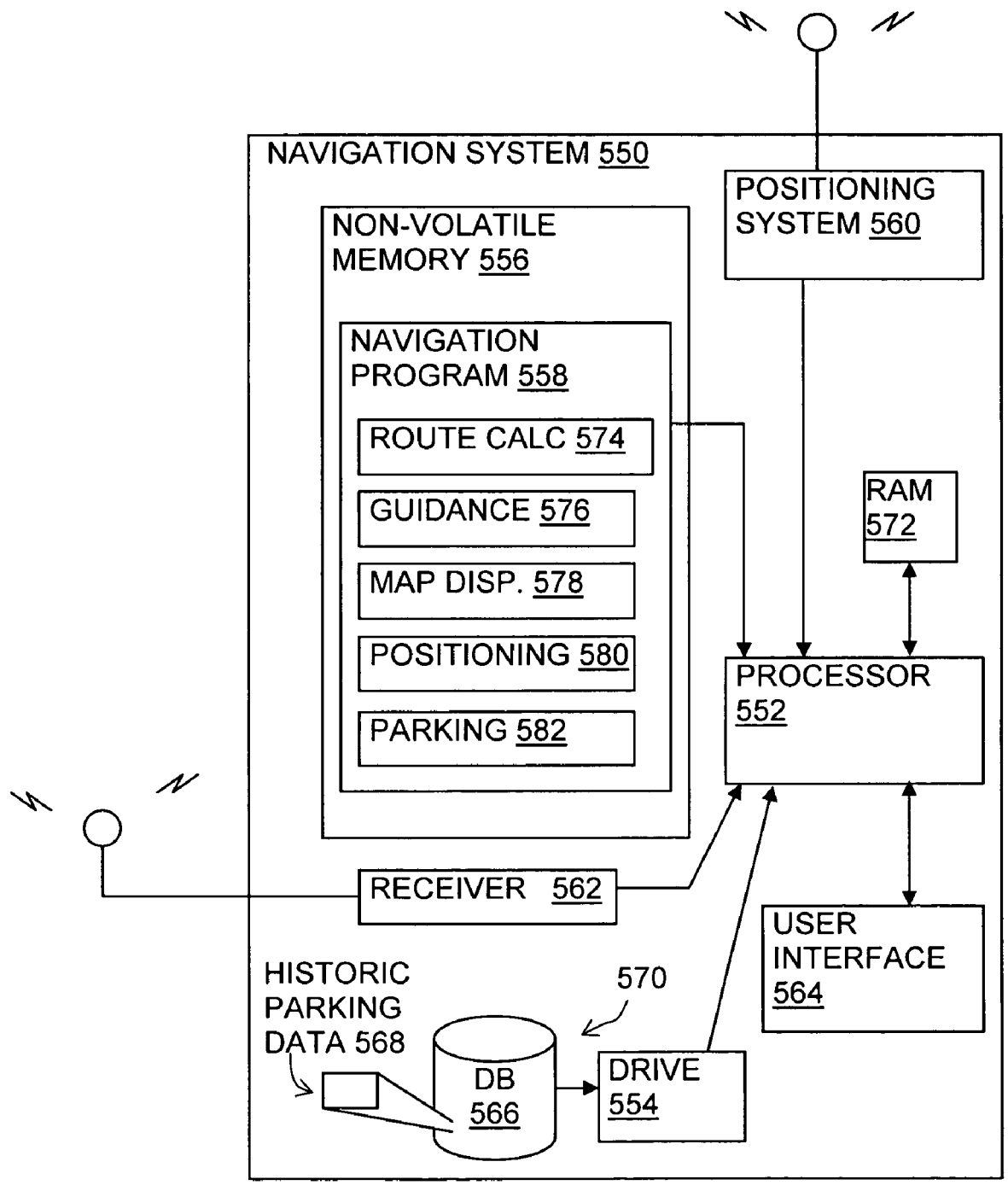
FIG. 11 is a block diagram of a stand-alone navigation system, according to an exemplary embodiment.

FIG. 11 illustrates one embodiment of a standalone navigation system 550. As shown in FIG. 11, the navigation system 550 is a combination of hardware and software components. The navigation system 550 includes a processor 552, a drive 554 connected to the processor 552, and a non-volatile memory storage device 556 for storing navigation application software programs 558 and possibly other information. The processor 552 may be of any type used in navigation systems.

The navigation system 550 may also include a positioning system 560. The positioning system 560 may utilize GPS-type technology, a dead reckoning-type system, or combinations of these, or other systems, all of which are known in the art. The positioning system 560 may include suitable sensing devices that measure the traveling distance speed, direction, and so on, of the vehicle. The positioning system 560 may also include appropriate technology to obtain a GPS signal, in a manner that is known in the art. The positioning system 560 outputs a signal to the processor 552. The navigation application software program 558 that is run on the processor 552 may use the signal from the positioning system 560 to determine the location, direction, speed, etc., of the vehicle associated with the navigation system 550.

The navigation system 550 also includes a user interface 564 that allows the end user to input information into the navigation system. This input information may include a request to use the navigation-related features of the navigation system 550.

The navigation system 550 uses a geographic database 566 stored on a storage medium 570. In this embodiment, the storage medium 570 is installed in the drive 554 so that the geographic database 566 can be read and used by the navigation system 550. In one embodiment, the geographic data 566 may be a geographic database published by NAVTEQ North America, LLC of Chicago, Ill. The storage medium 570 may be a CD-ROM, DVD, hard-drive, memory card or other currently available storage media, as well as storage media that may be developed in the future.

Additionally, the parking facility information, including the historic parking data 568, resides with the navigation system. The historic parking data 568 may be stored as part of the geographic database, or as a separate database on a separate medium (i.e. any media such as CD-ROM, DVD, hard-drive, memory card, etc.).

In one exemplary type of system, the navigation application software program 558 is loaded from the non-volatile memory 556 into a RAM 572 associated with the processor 552 in order to operate the navigation system 550. The processor 552 also receives input from the user interface 564. The input may include a request for navigation information. The navigation system 550 uses the geographic database 566 stored on the storage medium 570, possibly in conjunction with the outputs from the positioning system 560, to provide various navigation features and functions. The navigation application software program 558 may include separate applications (or subprograms) that provide these various navigation features and functions. These functions and features may include route calculation 574 (wherein a route to a destination identified by the end-user is determined), route guidance 576 (wherein detailed directions are provided for reaching a desired destination), map display 578, and vehicle positioning 580 (e.g., map matching).

Also included in the programming 558 on the navigation system 550 is parking programming 582. The navigation system 550 is capable of providing similar parking availability information and parking related services as discussed above in conjunction with FIGS. 9 and 10. In the standalone embodiment, the processes performed by the navigation services provider 404, including the parking application 436, are performed locally without communication to the navigation services provider 404. Since the navigation system does not communicate with a remote location to obtain parking availability information, the hardware and software components of the standalone navigation system identifies parking facilities proximate the desired destination and provides historic parking availability information using the historic parking data 568 stored locally with the navigation system 550.

In one embodiment, the standalone navigation system 550 may determine whether any external factors exist when providing historic parking availability information. Information indicating external factors may be obtained by wireless communication with a remote location or manually by user input. Some external factors, such as weather conditions, may be determined automatically with sensors. If the system cannot obtain information locally about external factors, the navigation system may provide an interface (e.g. on-screen prompt the user, or selection options) to obtain information about external factors from the user. The navigation system uses the determined external factors when generating the historic parking availability information.

C. Parking Message Broadcast System

Figure 12:
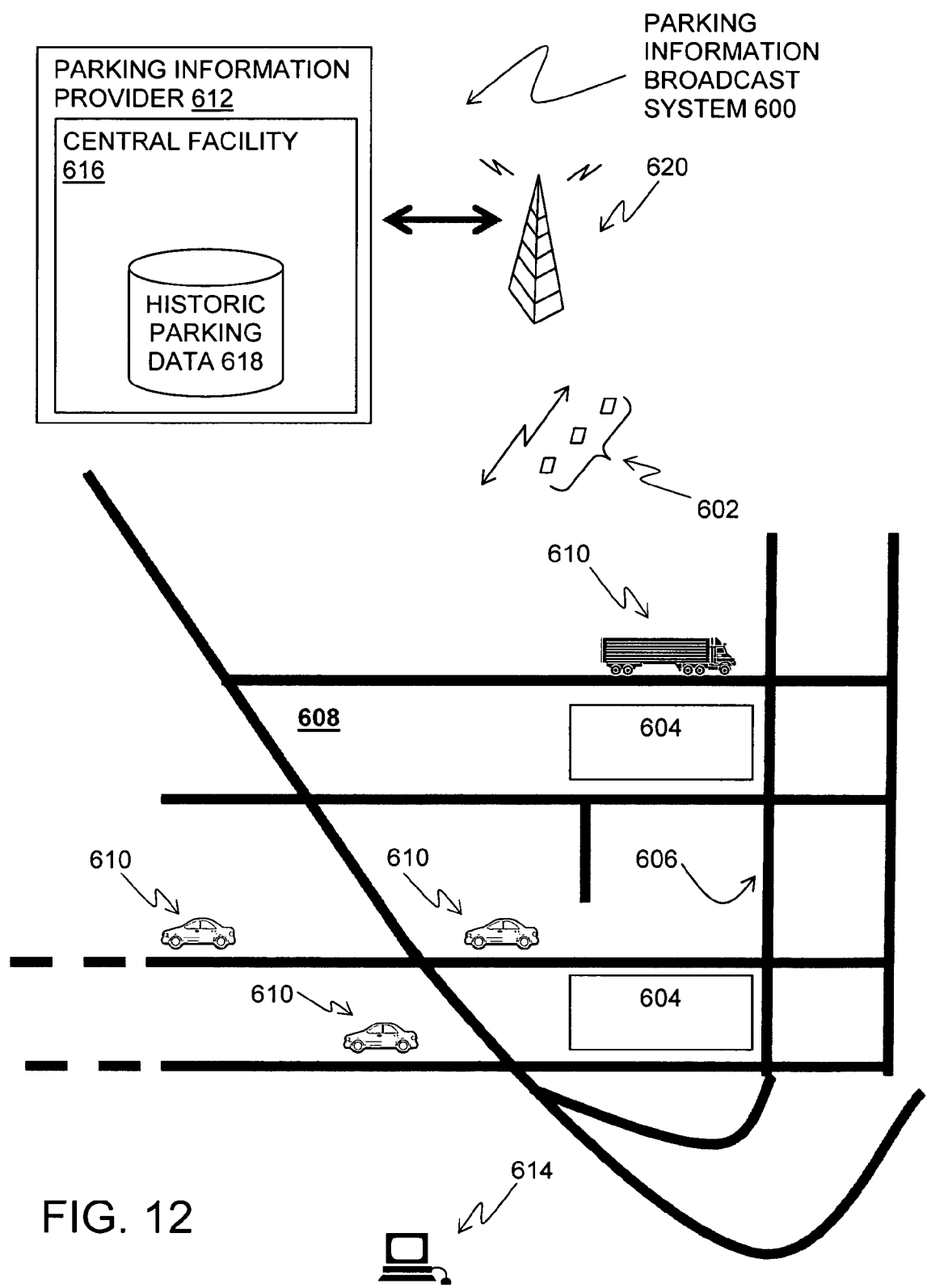
FIG. 12 is a block diagram of components of a parking information broadcast system, according to an exemplary embodiment.

FIG. 12 illustrates a parking message broadcast system 600 that broadcasts parking messages 602 regarding the parking availability at parking facilities 604 proximate a road network 606 in a geographic region 608, such as a city or metropolitan area. Vehicles 610, such as cars, trucks, motorcycles and so on, travel the road network 606 and park in the parking facilities 604. In one embodiment, the parking message broadcast system 600 is part of a traffic information broadcast system. One embodiment of a traffic information broadcast system is described in a pending application entitled "METHOD AND SYSTEM FOR DEVELOPING TRAFFIC MESSAGES" filed on Sep. 23, 2003, Ser. No. 10/668,916, the entire disclosure of which is incorporated by reference herein.

A parking information provider 612 operates the parking information broadcast system 600. Some or all of the vehicles 610 include suitable equipment that enables them to receive the parking messages 602 broadcast by the parking information broadcast system 600. The traffic messages 602 may also be received and used in systems that are not installed in vehicles (e.g., "non-vehicles 614"). These non-vehicles 614 may include workstations, personal computers, personal digital assistants, networks, pagers, televisions, radio receivers, telephones, and so on. The non-vehicles 614 that receive the parking messages 602 may obtain them in the same manner as the vehicles, i.e., by broadcast. Alternatively, the non-vehicles 614 may receive the parking messages 602 by other means, such as over telephone lines, over the Internet, via cable, and so on. The systems in the vehicles 610 or in the non-vehicles 614 that receive the parking messages 602 may include various different platforms as known to those skilled in the art.

Referring to FIG. 12, the parking information broadcast system 600 includes a central facility 616 operated by the parking information provider 612. In one embodiment, the central facility 616 includes historic parking data 618 associated with the equipment and programming of the central facility. The historic parking data 618 may be part of a geographic database or a separate database on a medium at the central facility 616. The central facility 616 also includes equipment and programming for developing and broadcasting the parking messages 602. The central facility 616 develops a plurality of parking messages 602 representing parking availability at a plurality of parking facilities 604. Each parking message 602 provides a parking facility identification code and data indicating parking availability at the corresponding parking facility. The parking message 602 may include other types of data indicating cost of the parking facility, amenities at the parking facility, type of parking facility, hours of operation, telephone number, location, capacity, promotions and any other information regarding the parking facility 604.

To broadcast the parking messages 602, the parking information broadcast system 600 includes transmission equipment 620. The transmission equipment 620 may comprise one or more FM transmitters, including antennas, or other wireless transmitters. The transmission equipment 620 provides for broadcasting the parking messages 602 throughout the region 608. The transmission equipment 620 may be part of the parking information broadcast system 600, or alternatively, the transmission equipment 620 may be equipment from other types of systems, such as cellular or paging systems, satellite radio, FM radio stations, and so on, to broadcast traffic messages 602 to the vehicles 610 and non-vehicles 614 in the region. In one embodiment, the central facility 616 transmits the parking messages 602 to a broadcaster that broadcasts the parking messages 602. (For purposes of this disclosure and the appended claims, the broadcasting of parking messages is intended to include any form of transmission, including direct wireless transmission.)

In one embodiment, the vehicles 610 include a navigation system similar to the navigation system 550 illustrated in FIG. 11. Referring to FIG. 11, the navigation system 550 includes a receiver 562. The receiver 562 may be a satellite radio or FM receiver tuned to the appropriate frequency used by the parking broadcast information system 600 to broadcast the parking messages 602. The receiver 562 receives the traffic messages 602 from the parking information data provider 612. (In an alternative embodiment in which the traffic messages are sent by a direct wireless transmission, such as via a cellular wireless transmission, the receiver 562 may be similar or identical to a cellular telephone.) The receiver 562 provides an output to the processor 552 so that appropriate programming in the navigation system 550 can utilize the parking messages 602 broadcast by the traffic broadcast system 600 when performing navigation-related functions.

Additionally, the received parking messages 602 may be stored in memory associated with the navigation system 550 and accessed at an appropriate time by the processor 552. In one embodiment, the navigation program 558 on the navigation system 550 includes a parking application 582. The navigation system 550, using the parking application 582 and received parking messages 602, is capable of providing similar parking availability information and parking related services as discussed above in conjunction with FIGS. 9 and 10. For example, the navigation system 550 uses the geographic database 566 to identify parking facilities proximate a desired destination. The navigation system 550 determines if any of the received parking messages 602 include provide parking availability information for the identified parking facilities. In one embodiment, the navigation system determines whether any of the parking messages 602 include a parking facility identification code corresponding to the identified parking facilities proximate the desired destination. If the received parking messages 602 provide parking availability information for the identified parking facilities, the navigation system uses the data indicating parking availability from the parking message 602 to provide parking availability information at the identified parking facilities to the end user.

In one embodiment, the central facility 616 develops the plurality of parking messages 602 using historic parking data 618. The data indicating parking availability for the parking facility is obtained from the historic parking data 618 corresponding to the current time, date or day of week and any external factors. The parking information provider 612 broadcasts the parking messages 602 which are received by the receiver 562 of the navigation system 550. For this embodiment, the navigation system 550 does not include historic parking data stored locally. Rather, the navigation system 550 obtains the historic parking data via the parking messages 602.

In another embodiment, the central facility 616 develops the plurality of parking messages 602 using a combination of real time parking data and the historic parking data 618. The central facility 616 may receive data representing the real time parking availability at parking facilities. Real time parking availability is the measured current parking availability, such as just measured parking availability and parking availability that was measured a short time prior to the current time, such as thirty to fifteen minutes. The central facility 616 may receive the real time parking data from aggregators that aggregate parking information from multiple parking facilities, operators of parking facilities and/or sensors (with a controller) that provide a number of currently available parking spaces. In one embodiment, central facility 616 develops parking messages 602 using the available real time data and historic parking data when the real time data is unavailable. For example, real time parking availability information is provided for one of the parking facilities but not for another parking facility. The central facility develops the parking messages using the real time information for the prior parking facility and historic parking data for the former parking facility. The parking information provider 612 broadcasts the parking messages 602 which are received by the receiver 562 of the navigation system 550. In one embodiment, the parking message 602 includes a real-time/historic code indicating whether the parking availability information included in the messages is based on real time or historic information. Additionally, the navigation system may use the real-time/historic code to indicate to the end user whether the parking availability information is based on real time or historic information.

In another embodiment, the central facility 616 obtains real time parking information and develops the plurality of parking messages 602 for instances when the real time parking information differs from the historic parking data. The present embodiment provides a reduction in the number of parking messages broadcasted to end users. Instead of broadcasting parking messages providing real time availability for the parking facilities, parking messages are only generated and broadcasted when the real time availability differs from the historic parking availability. In this embodiment, the navigation system 550 that receives the parking messages 602 includes the historic parking data stored locally. When the parking application requires parking information, it checks for parking messages containing real time information that differs from the historic information. If no parking messages relate to desired parking facilities, the parking application uses the historic parking data. In one embodiment, the parking message 602 may include a code indicating that the real-time availability differs from the historic availability. Additionally, the navigation system may indicate to the end user whether the parking availability information is based on real time or historic information.

Additionally, if the parking application needs to estimate the parking availability for a time in the future, the parking application checks for parking messages containing real time information that differs from the historic information. If real time information exists, the parking application compares the real time availability to the historic availability for the current time and uses the difference to extrapolate the expected parking availability at the future time. For example, if the real time availability is 25% less than historic parking availability for the current time, the parking application reduces the historic parking availability corresponding to the future time by 25%.

In a further embodiment, the central facility 616 obtains real time parking information and uses the real time parking information to update the historic parking data. In one embodiment, the central facility 616 collects parking facility data by collecting the real time parking information. The central facility 616 may also collect external factors that existed at the times corresponding to the real time parking information in the manner discussed above. The collected real time parking information may then be analyzed in the manner discussed above to create a new historic parking model or modify the existing historic parking model or confirm the accuracy of the existing historic parking model.

D. Parking Information Device

In this embodiment, the parking-related features and functions described above are provided on a parking-only device. The above descriptions provide the various parking-related features and functions using a navigation system that also provides navigation-related features and functions, such as route calculation and guidance. In the present embodiment, the parking information device provides the above described parking-related features and functions without providing the navigation-related features and functions. In one embodiment, the end user may receive parking availability information, either real time or historic, for parking facilities proximate an entered destination without receiving route guidance to reach the facility. The parking-only device comprises a computing platform, such as computing devices located in vehicles, personal computers, personal organizers (e.g., PDAs), wireless phones, or any other types of computing devices that have the appropriate hardware and software to obtain and process parking availability information including real time and historic parking data.

E. Internet Application

In this embodiment the parking availability information is available over the Internet via Internet services providers, or any other providers of navigation-related applications. For example, web based map application services may provide parking availability information in addition to providing navigation-related information, such as route calculation, guidance, destination search, point of interests search and maps. The application providing parking availability information may be accessed via a web browser located on a computing device such as a personal computer, PDA, cell phone or any computing platform.

In one embodiment, the navigation-related applications operate on a server with access to a geographic database and historic parking data to provide the parking availability information. For example, end users may search for a restaurant. Upon identifying the desired restaurant, the application identifies parking facilities proximate the desired restaurant and provides historic parking availability information using historic parking data in a similar manner as discussed above. In one embodiment, the application may request the end user to enter an estimated time of arrival at the restaurant, such as 8:00 PM. Using the estimated time of arrival, the application provides historic parking data indicating parking availability at parking facilities for the specified time. For example, the application may indicate that at 8:00 PM on Friday, street parking historically has 3 parking spaces available and a parking lot associated with the restaurant historically has 10 spaces available. The Internet application may also determine whether any external factors, such as weather conditions and theater shows, exist when providing historic parking availability information.

F. Concierge-Type Services

In another embodiment, a concierge-type service may use the historic parking data to provide parking availability information. For example, an end user of a concierge-type service indicates that he or she will be taking a 4:00 PM flight at the city airport or he or she will be attending the 8:00 PM opera, and the concierge-type service provides recommendations for a departure time and parking at the desired destination.

In one embodiment, the concierge-type service is another server application on the navigation services server of FIG. 8. The end user sends information regarding the destination and desired time of arrival to the navigation services server at some time prior to the end user's departure. The concierge application uses the geographic database and historic parking data to provide any helpful tips regarding the upcoming trip. For example, the concierge application using historic parking data may determine that the parking garage associated with the opera building typically reaches full capacity at approximately 7:45 PM on nights with operas. Accordingly, the concierge application provides a message to the end user recommending that he or she should arrive prior to 7:45 PM to obtain parking. Additionally, for example, the concierge application using historic parking data may determine that the covered parking garage at the city airport is typically full from 2:00 PM to 5:00 PM. Accordingly, the concierge application provides a message to the end user recommending that he or she proceed directly to and park in the uncovered parking lot at the airport. Furthermore, other concierge services are possible using the historic parking data.

It is intended that the foregoing detailed description be regarded as illustrative rather than limiting and that it is understood that the following claims including all equivalents are intended to define the scope of the invention.

We claim:

1. A method of obtaining data for a geographic database for use with a navigation system, the method comprising:
    collecting data indicating an event in a geographic region in which a parking facility is located, wherein said event selected from the group consisting of: sporting event, entertainment event, convention, exhibit, parade and holiday;
    collecting data indicating parking availability at said parking facility during said event including collecting data indicating locations of respective empty parking spaces;
    analyzing said data indicating parking availability;
    based on said analyzing, modeling an influence factor corresponding to historic parking data for said parking facility, said historic parking data indicating past parking availability at said parking facility including location information of available parking spaces and said influence factor indicating an increase or decrease in said past parking availability based on said event; and
    storing said historic parking data and said influence factor in said geographic database.

2. The method of claim 1 wherein said historic parking data indicates a number of said available parking spaces.

3. The method of claim 1 further comprising associating said historic parking data with data representing said parking facility in said geographic database.

4. The method of claim 1 wherein said historic parking data indicates past parking availability for different days of the week.

5. The method of claim 1 further comprising:
    collecting data indicating weather conditions in a geographic region in which said parking facility is located.

6. The method of claim 5 wherein said historic parking data indicates past parking availability in view of predetermined weather conditions.

7. The method of claim 1 wherein said historic parking data provide an indication of parking availability at specified times of the day.

8. The method of claim 1 wherein said historic parking data is associated with data indicating a location of said parking facility.

9. The method of claim 1 wherein said historic parking data includes a table containing past parking availability at said predetermined times.

10. A method of obtaining data for a geographic database that represents roads in a geographic region, the method comprising:
    collecting data indicating parking availability at a parking facility at a plurality of times during a predetermined time period, wherein collecting the data includes collecting data indicating parking availability at said parking facility during a weather condition including collecting data indicating locations of respective empty parking spaces;
    analyzing said data indicating parking availability to identify a pattern of past parking availability at said parking facility, wherein data representing said pattern includes location information of available parking spaces at said parking facility,
    using said pattern of past parking availability at said parking facility to develop a historic parking model and a weather influence factor, said historic parking model provides parking availability at said parking facility for a plurality of times for different days of the week and said weather influence factor comprises a percentage change in said parking availability of said historic parking model based on said weather condition; and
    associating data representing said historic parking model and said weather influence factor with data representing said parking facility in said geographic database.

11. The method of claim 10 wherein said historic parking model is stored in said geographic database.

12. The method of claim 10 wherein said historic parking model is stored in a database separate from said geographic database.

13. The method of claim 10 wherein said data representing said parking facility in said geographic database is data representing a location of said parking facility.

14. The method of claim 10 wherein said weather influence factor is stored in a database separate from said geographic database.

15. A method of obtaining parking information, the method comprising:
    collecting data indicating parking availability at a parking facility at a plurality of times during a time period including collecting data indicating locations of respective empty parking spaces at said parking facility;
    identifying a pattern of past parking availability at said parking facility from said collected data, wherein data representing said pattern includes location information of available parking spaces at said parking facility; and
    associating said data representing said pattern of past parking availability with data of a geographic database that represents a location of said parking facility.

16. The method of claim 15 wherein said data representing said pattern of past parking availability indicates parking availability at predetermined time intervals.

17. The method of claim 15 wherein said data representing said pattern of past parking availability indicates parking availability for different days of the week.

18. The method of claim 15 further comprising:
collecting data indicating weather conditions in a geographic region in which said parking facility is located;
wherein said step of identifying said pattern of past parking availability considers said weather conditions.

19. The method of claim 15 further comprising:
collecting data indicating events in a geographic region that said parking facility is located;
wherein said step of identifying said pattern of past parking availability considers said events.

20. The method of claim 15 wherein said data representing said pattern of past parking availability is stored in a database separate from said geographic database.

* * * * *